(12) United States Patent
Hu

(10) Patent No.: US 10,221,708 B2
(45) Date of Patent: Mar. 5, 2019

(54) TANGENTIAL ON-BOARD INJECTION VANES

(71) Applicant: United Technologies Corporation, Farmington, CT (US)

(72) Inventor: Jin Hu, Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 291 days.

(21) Appl. No.: 14/955,808

(22) Filed: Dec. 1, 2015

(65) Prior Publication Data

US 2016/0201492 A1     Jul. 14, 2016

Related U.S. Application Data

(60) Provisional application No. 62/086,906, filed on Dec. 3, 2014.

(51) Int. Cl.
*F01D 9/04* (2006.01)
*F01D 5/08* (2006.01)

(52) U.S. Cl.
CPC .......... *F01D 9/041* (2013.01); *F01D 5/081* (2013.01); *F05D 2240/126* (2013.01); *F05D 2240/129* (2013.01); *F05D 2250/74* (2013.01); *F05D 2260/14* (2013.01); *Y02T 50/673* (2013.01); *Y02T 50/676* (2013.01)

(58) Field of Classification Search
CPC .... F01D 9/041; F01D 5/081; F01D 2240/126; F01D 2240/129; F01D 2250/74; F01D 2260/14; F01D 5/087; F01D 2240/121; F01D 2240/122; F01D 2240/127; F01D 2260/2212; F01D 2240/128; Y02T 50/673; Y02T 50/676
USPC .......................................... 415/115
See application file for complete search history.

(56) References Cited

U.S. PATENT DOCUMENTS

| | | | | |
|---|---|---|---|---|
| 5,354,178 | A  * | 10/1994 | Ferleger | F01D 5/141 416/223 A |
| 5,779,443 | A  * | 7/1998 | Haller | F01D 5/141 415/191 |
| 6,183,193 | B1 * | 2/2001 | Glasspoole | F01D 5/08 415/115 |
| 6,267,553 | B1 * | 7/2001 | Burge | F01D 5/06 415/115 |
| 9,157,325 | B2 * | 10/2015 | Suciu | F01D 5/081 |
| 9,512,727 | B2 * | 12/2016 | Johann | F01D 5/34 |
| 9,567,858 | B2 * | 2/2017 | Gallagher | F01D 5/141 |

(Continued)

*Primary Examiner* — Logan M Kraft
*Assistant Examiner* — Brian Christopher Delrue
(74) *Attorney, Agent, or Firm* — Cantor Colburn LLP

(57) ABSTRACT

A tangential on-board injection (TOBI) system for gas turbine engines includes a first endwall and a second endwall radially spaced apart from the first endwall. A plurality of airfoils extend radially from the first endwall to the second endwall. Each airfoil has a leading edge and a trailing edge. Each airfoil includes a first fillet portion transitioning between the airfoil and the first endwall and a second fillet portion transitioning between the airfoil and the second endwall. The radius of curvature of the first and second fillet portions proximate to the leading edge of the airfoil is larger than the radius of curvature of the first and second fillet portions proximate to the trailing edge.

18 Claims, 3 Drawing Sheets

(56) References Cited

U.S. PATENT DOCUMENTS

| | | | | |
|---|---|---|---|---|
| 2001/0036401 A1* | 11/2001 | Harvey | F01D 5/145 | 415/115 |
| 2003/0106215 A1* | 6/2003 | Heyward | B23P 6/002 | 29/889.1 |
| 2004/0042900 A1* | 3/2004 | Dougherty | F01D 5/081 | 416/97 R |
| 2004/0081548 A1* | 4/2004 | Zess | F01D 5/145 | 415/1 |
| 2004/0187475 A1* | 9/2004 | Usab, Jr. | F01D 5/142 | 60/204 |
| 2004/0234372 A1* | 11/2004 | Shahpar | F01D 5/142 | 415/149.1 |
| 2006/0275112 A1* | 12/2006 | Lee | F01D 5/143 | 415/191 |
| 2007/0227706 A1* | 10/2007 | Lutjen | F01D 5/187 | 165/109.1 |
| 2013/0098061 A1* | 4/2013 | Matwey | F01D 5/046 | 60/785 |
| 2015/0267549 A1* | 9/2015 | Facchinetti | F01D 5/189 | 415/1 |
| 2016/0010487 A1* | 1/2016 | Breeze-Stringfellow | F02K 1/46 | 415/148 |
| 2016/0265551 A1* | 9/2016 | Bailey | F01D 9/041 | |
| 2017/0204739 A1* | 7/2017 | Rawson | B08B 3/003 | |

* cited by examiner

TANGENTIAL ON-BOARD INJECTION VANES

CROSS REFERENCE TO RELATED APPLICATIONS

This application claims the benefit of U.S. Provisional Patent Application Ser. No. 62/086,906, filed on Dec. 3, 2014, the entire contents of which are incorporated herein by reference thereto.

BACKGROUND OF THE DISCLOSURE

1. Field of the Disclosure

The present disclosure relates to gas turbine engines, and more particularly to turbine tangential on-board injection (TOBI) systems of gas turbine engines.

2. Description of Related Art

A typical gas turbine engine includes a compressor, a combustor, and a turbine. Airflow entering the compressor is compressed and directed to the combustor where it is mixed with fuel and ignited, producing hot combustion gases used to drive the turbine. Typically, cooling air is channeled through a tangential on-board injection (TOBI) system to meet some turbine component temperature and pressure requirements.

Generally, the inlet of the TOBI system receives air from the compressor or a source of cooling air and passes the cooling air through nozzles that impart a swirling moment and direct the discharging stream tangentially to the rotating turbine disk. The velocity, amount and direction of the cooling air are important factors to the effectiveness of the TOBI system's cooling capacity and its effect on the overall engine performance.

However, there is still a need in the art for improved TOBI systems. The present disclosure provides a solution for this need.

SUMMARY OF THE DISCLOSURE

A tangential on-board injection (TOBI) system for gas turbine engines includes a first endwall and a second endwall radially spaced apart from the first endwall. A plurality of airfoils extend radially from the first endwall to the second endwall. Each airfoil has a leading edge and a trailing edge. Each airfoil includes a first fillet portion transitioning between the airfoil and the first endwall and a second fillet portion transitioning between the airfoil and the second endwall. The radius of curvature of the first and second fillet portions proximate to the leading edge of the airfoil is larger than the radius of curvature of the first and second fillet portions proximate to the trailing edge.

The pitch distance between the respective leading edges of two of the airfoils can be more than twenty times the radius of curvature of each fillet portion proximate to the leading edge of the airfoil. The radius of curvature of the first and second fillet portions proximate to the leading edge of each airfoil can be approximately 0.07 inches (1.8 mm). The mean gage distance between two of the plurality of airfoils can be approximately 0.16 inches (4.1 mm). The total mean gage area between the plurality of airfoils can range from 0.80 in$^2$ (516 mm$^2$) to 0.97 in$^2$ (626 mm$^2$), for example, the total mean gage area can be 0.89 in$^2$ (574 mm$^2$).

The first and second endwalls can form an annulus therebetween with a radial height of approximately 0.26 inches (6.60 mm). The plurality of airfoils can range from eighteen to twenty-eight airfoils, for example can include twenty-four airfoils. The first and second endwalls can each include circumferentially segmented portions. The first and second endwalls can define a centerline axis. The first and second endwalls can be inner and outer endwalls, respectively. The distance from the centerline axis to an outer surface of the second endwall can be approximately 5.7 inches (14.5 cm). The distance from the centerline axis to an outer surface of the first endwall can be approximately 5.4 inches (13.7 cm). The radius of curvature of each fillet portion proximate to the leading edge of the airfoil can range from 0.063 to 0.085. The radial height of the annulus between first and second endwalls can range from 0.228 to 0.309. The distance from the centerline axis to the outer surface of the second endwall can range from 5.101 to 6.901. The distance from the centerline axis to an outer surface of the first endwall can range from 4.873 to 6.593. The range values described above are scaled by a local axial chord, wherein the local axial chord corresponds to a width of the airfoil between the leading and trailing edges.

An external surface of one of the airfoils is formed in substantial conformance with a set of Cartesian coordinates set forth in Table 1, wherein the Cartesian coordinates are provided by an axial coordinate scaled by a local axial chord, a circumferential coordinate scaled by a local axial chord, and a span location, wherein the local axial chord corresponds to a width of the airfoil between the leading and trailing edges at the span location. The span location can be in the middle of the airfoil body. Substantial conformance with the set of Cartesian coordinates set forth in Table 1 can include values within ±15% of each coordinate. A method of producing a tangential on-board injection (TOBI) system for a gas turbine engine includes casting a TOBI system, such as the TOBI system described above.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
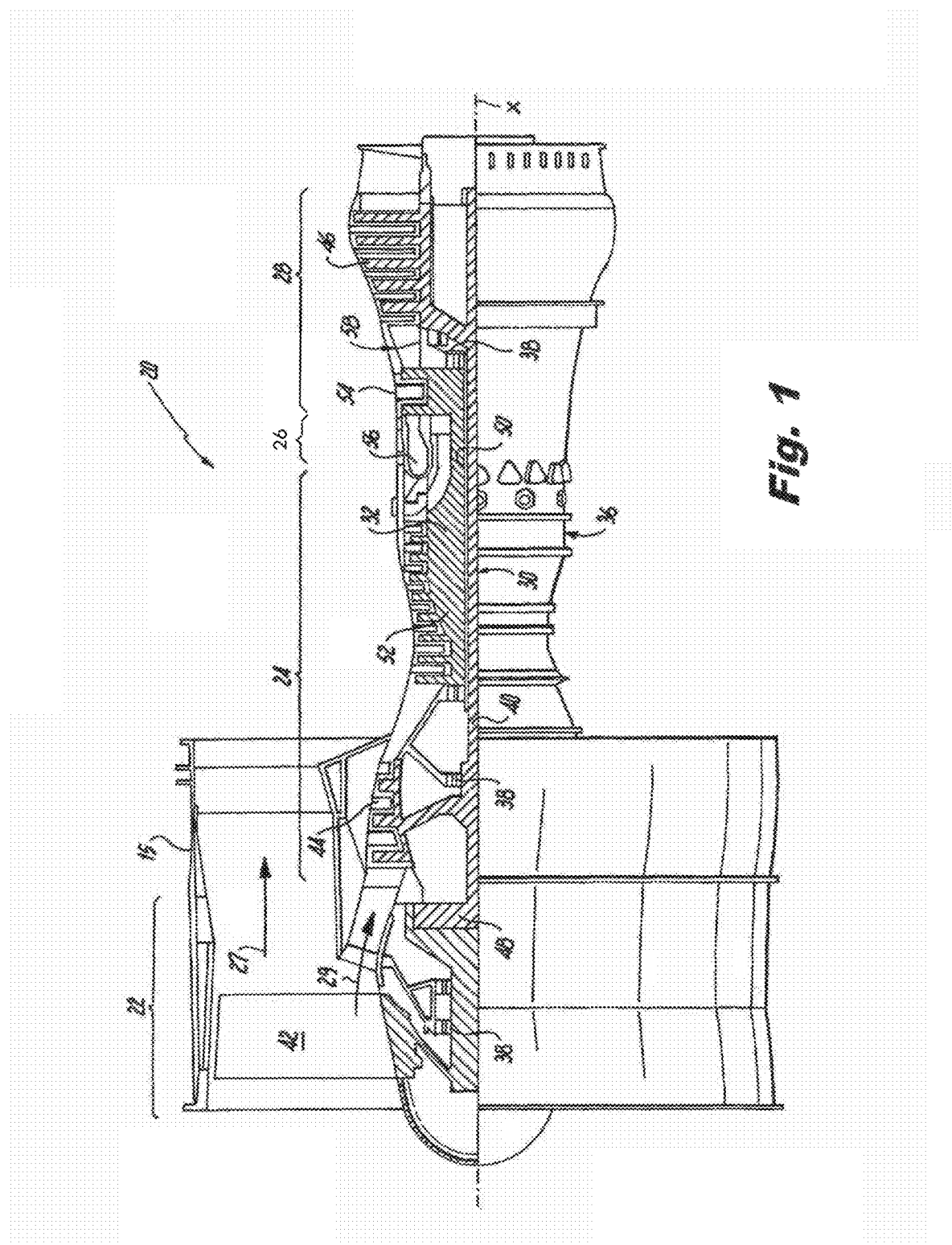
FIG. 1 is a schematic cross-sectional side elevation view of an exemplary embodiment of a gas turbine engine constructed in accordance with the present disclosure.

Reference will now be made to the drawings wherein like reference numerals identify similar structural features or aspects of the subject disclosure. For purposes of explanation and illustration, and not limitation, a partial view of an exemplary embodiment of a TOBI system for gas turbine engines in accordance with the disclosure is shown in FIG. 1 and is designated generally by reference character 100. Other embodiments of the TOBI system in accordance with the disclosure, or aspects thereof, are provided in FIGS. 2-5, as will be described.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path 27 in a bypass duct defined within a fan case 15, while the compressor section 24 drives air along a core flow path 29 for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

With continued reference to FIG. 1, the exemplary engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. A mid-turbine frame 58 of the engine static structure 36 is arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis X which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

Figure 2:
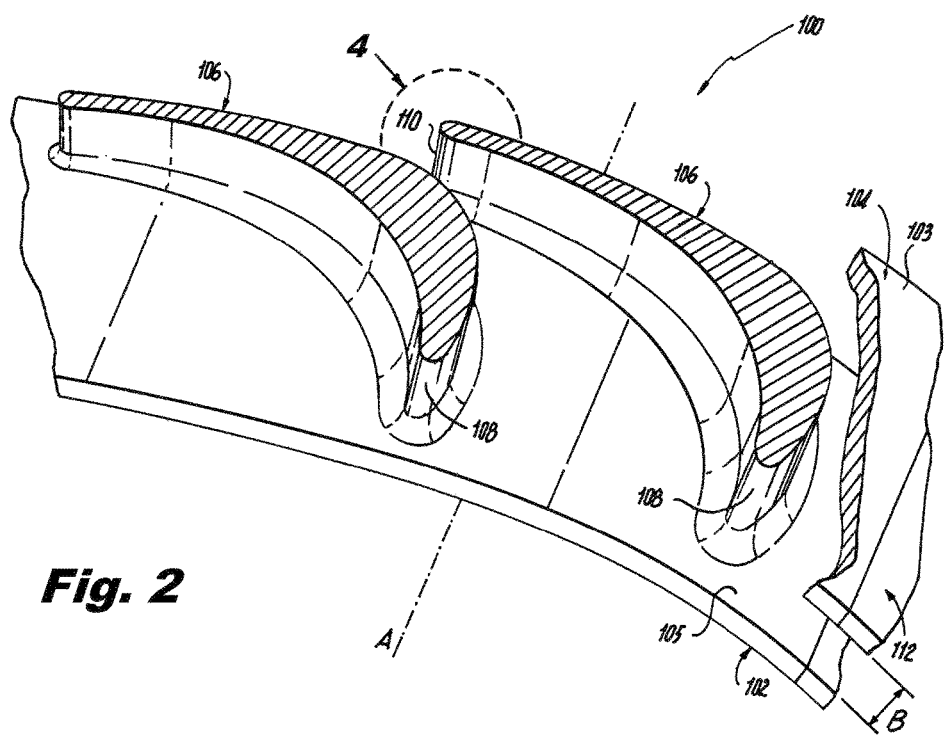
FIG. 2 is a perspective view of a partial cross-section of a portion of an embodiment of a TOBI system constructed in accordance with the present disclosure, showing inner and outer endwalls with airfoils therebetween.

Now with reference to FIGS. 1 and 2, TOBI system 100 receives air from the compressor section 24 or from another source of cooling air and passes it through annular spaced nozzles that impart a swirling moment and directs the discharging stream tangentially to one or more of the turbines 46 and 54. The cooling air is delivered to the turbine rotor through a plurality of nozzles.

As shown in FIG. 2, TOBI system 100 for gas turbine engines includes first and second endwalls 102 and 104, respectively, e.g. an inner endwall 102 and an outer endwall 104, that define a centerline axis A. Outer endwall 104 is radially spaced apart from inner endwall 102. Airfoils 106 extend radially from inner endwall 102 to outer endwall 104. Each airfoil has a leading edge 108 and a trailing edge 110. Inner and outer endwalls 102 and 104, respectively, form a gas path annulus therebetween with a radial height B ranging from 0.228 to 0.309. For example, radial height B can be approximately 0.26 inches (6.60 mm). Those skilled in the art will readily appreciate that while two airfoils 106 are shown, there can be any number of suitable airfoils 106 circumferentially spaced apart between inner and outer endwalls, 102 and 104 respectively, for example, there can be twenty-four (24) airfoils evenly spaced apart. The distance from centerline axis A to an outer surface 103 of outer endwall 104 ranges from 5.101 to 6.901. For example, the distance from centerline axis A to an outer surface 103 of outer endwall 104 can be approximately 5.7 inches (14.5 cm). The distance from centerline axis A to an outer surface 105 of inner endwall 102 ranges from 4.873 to 6.593. For example, the distance from centerline axis A to an outer surface 105 of inner endwall 102 can be approximately 5.4 inches (13.7 cm). The ranges described above are all normalized, e.g. scaled, based on an axial chord Y, schematically shown in FIG. 3, of airfoil 106. Axial chord Y, for example, can range from 0.8 inches (20.3 mm) to 1 inch (25.4 mm).

With continued reference to FIG. 2, inner and outer endwalls, 102 and 104, respectfully include circumferential segmented portions 112. Circumferentially segmented portions 112 are joined to form respective continuous inner and outer endwall rings. It is contemplated that inner and outer endwalls 102 and 104, respectively, can each be formed as a single continuous endwall ring.

Figure 3:
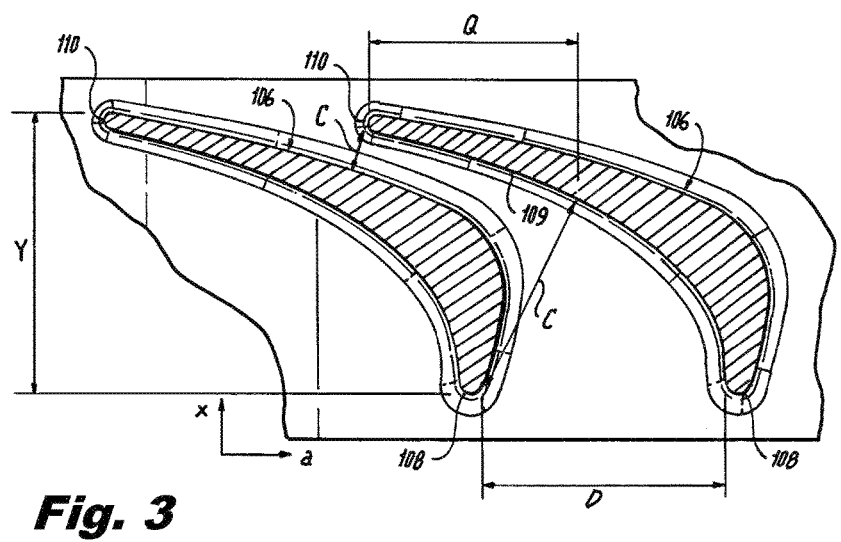
FIG. 3 is a schematic top plan view of a cross-section of two adjacent airfoils of the TOBI system of FIG. 2, showing the gage distance between the airfoils.

With reference now to FIG. 3, gage distance C is the distance between airfoils 106 taken along a line extending normal from the concave surface of one airfoil, for example, concave surface 109, until it meets the other airfoil. The mean gage distance is the mean of all of the gage distances C between airfoils 106 over a given range Q, best seen in FIG. 2. The mean gage distance between airfoils 106 ranges from 0.144 to 0.195. This range is normalized based on axial chord Y of airfoil 106. For example, the mean gage distance can be approximately 0.16 inches (4.1 mm). The pitch distance D between respective leading edges 108 of two of airfoils 106 ranges from 1.378 to 1.864. For example, the pitch distance D can be approximately 1.46 inches (3.71 cm). The ranges described above are both normalized based on axial chord Y of airfoil 106.

Figure 4:
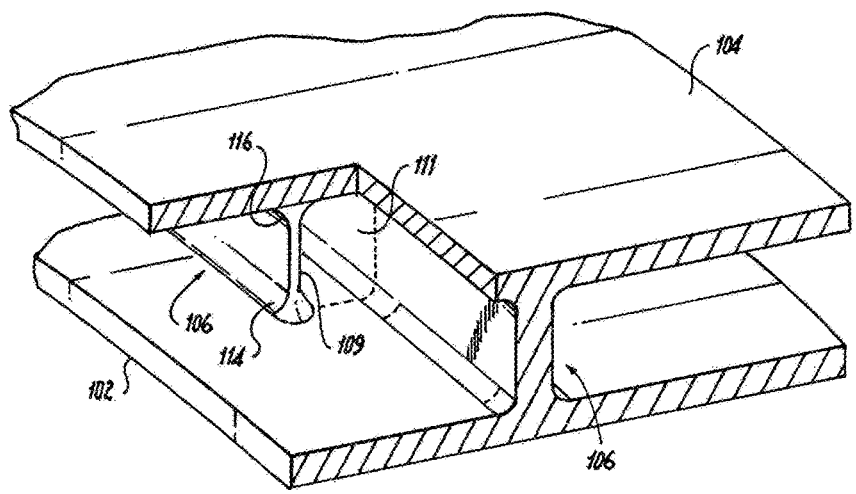
FIG. 4 is a perspective view of a portion of the TOBI system of FIG. 2, showing the trailing edge of one of the airfoils.

As shown in FIG. 4, gage area 111, indicated with the dashed lines, is the area of a plane defined between two airfoils 106 and inner and outer endwalls, 102 and 104 respectfully. The plane extends normal from concave surface 109 of one airfoil 106, until it meets the other airfoil. The mean gage area is the average of all gage areas 111 between two airfoils 106 over a given range. The range for mean gage area is similar to the range for mean gage distance, described above and as shown in FIG. 2. The mean gage area between two airfoils 106 ranges from 0.033 in$^2$ (21.3 mm$^2$) to 0.041 in$^2$ (26.5 mm$^2$). For example, the mean gage area can be approximately 0.037 in$^2$ (23.8 mm$^2$). The total mean gage area for a plurality of airfoils, for example twenty-four airfoils, can range from 0.80 in$^2$ (516 mm$^2$) to 0.97 in$^2$ (626 mm$^2$). For example, the total mean gage area for twenty-four airfoils can be approximately 0.89 in$^2$ (574 mm$^2$). Those skilled in the art will readily appreciate that the mean gage area is equal to the mean gage distance, multiplied by radial height B, minus the average area of any fillets in the range described above. It is contemplated that the number of airfoils can range from eighteen to twenty-eight airfoils.

Figure 5:
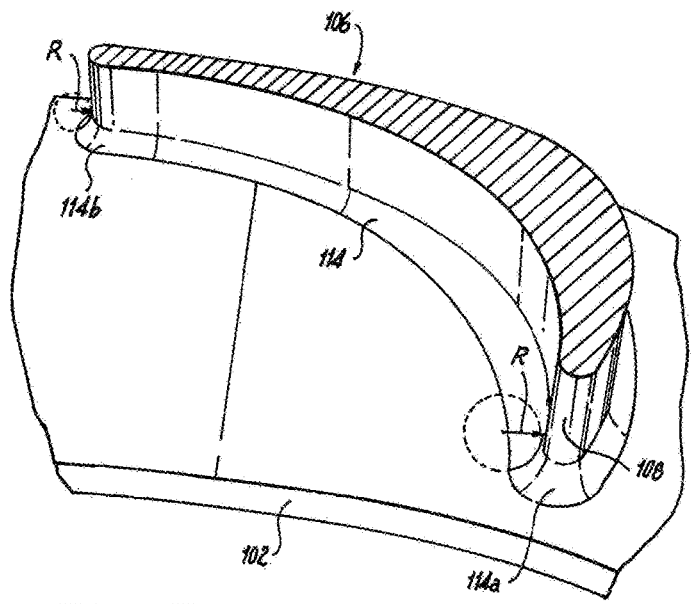
FIG. 5 is a perspective view of a cross-section of a portion of the TOBI system shown in FIG. 2, showing the fillet portion proximate to the leading edge of one of the airfoils.

Now with reference to FIG. 5, each airfoil 106 includes a first fillet portion 114, e.g. an inner fillet portion 114, transitioning between airfoil 106 and inner endwall 102 and a second fillet portion 116, e.g. an outer fillet portion, transitioning between airfoil 106 and outer endwall 104, as shown in FIG. 4. The radius of curvature R of inner and outer fillet portions, 114 and 116, respectively, proximate to leading edge 108 of airfoil 106 is larger than the radius of curvature R of inner and outer fillet portions, 114 and 116, respectively, proximate to trailing edge 110. For example, inner fillet portion 114a is shown larger than inner fillet portion 114b. Outer fillet portion 116, shown in FIG. 4, is similar to inner fillet portion 114. Radius of curvature R of inner fillet portion 114a ranges from 0.063 to 0.085. For example, radius of curvature R can be approximately 0.07 inches (1.8 mm). It is contemplated that pitch distance D, described above, can be more than twenty times radius of curvature R of inner fillet portion 114a. The range described above is normalized based on axial chord Y of airfoil 106.

The geometry of airfoil 106 is described in terms of Cartesian coordinates defined along axial and circumferential axes. The axial (x) and circumferential (a) coordinates, schematically shown in FIG. 3, are normalized by local axial chord Y in the middle of airfoil 106, e.g. 50% span of the airfoil body. Local axial chord Y corresponds to a width of the airfoil in an axial direction, e.g. parallel to centerline axis A, between the leading and trailing edges at the span location. The span location corresponds to a percentage of an overall span distance in the radial direction from a point where airfoil 106 meets inner endwall 102 to a point where airfoil 106 meets outer endwall 104. The contour of airfoil 106 is set forth in Table 1, which provides axial (x) and circumferential (a) coordinates at a cross-section taken in the middle of airfoil 106, e.g. 50% span, half-way between endwalls 102 and 104. The axial dimension (x) is zero at the leading edge of the airfoil and the circumferential dimension (a) is zero at the trailing edge of the airfoil. Those skilled in the art will readily appreciate that an airfoil can be in substantial conformance with the set of Cartesian coordinates set forth in Table 1 by being within ±15% of each coordinate. The axial (x) and circumferential (a) coordinates in Table 1 are in inches, but can be converted to metric (mm) by multiplying by 25.4. The manufacturing tolerance relative to the specified coordinates is ±1.0%. The coordinates define points on a cold, uncoated, stationary airfoil surface. Additional elements such as cooling holes, protective coatings, fillets and seal structures may also be formed onto the specified airfoil surface, or onto an adjacent endwall surface, but these elements are not necessarily described by the normalized coordinates.

TABLE 1

| x | a | x | a | x | a |
|---|---|---|---|---|---|
| 0.0000 | −2.5495 | 0.8729 | −0.6328 | 0.9390 | −0.6162 |
| 0.0001 | −2.5464 | 0.8879 | −0.5549 | 0.9290 | −0.7029 |
| 0.0002 | −2.5437 | 0.9014 | −0.4820 | 0.9182 | −0.7926 |
| 0.0008 | −2.5382 | 0.9138 | −0.4126 | 0.9069 | −0.8821 |
| 0.0019 | −2.5324 | 0.9249 | −0.3479 | 0.8945 | −0.9751 |
| 0.0042 | −2.5240 | 0.9348 | −0.2890 | 0.8815 | −1.0672 |
| 0.0086 | −2.5137 | 0.9434 | −0.2356 | 0.8678 | −1.1596 |
| 0.0160 | −2.5018 | 0.9510 | −0.1879 | 0.8532 | −1.2517 |
| 0.0299 | −2.4876 | 0.9575 | −0.1459 | 0.8376 | −1.3437 |
| 0.0522 | −2.4752 | 0.9630 | −0.1094 | 0.8210 | −1.4356 |
| 0.0830 | −2.4695 | 0.9675 | −0.0787 | 0.8032 | −1.5274 |
| 0.1186 | −2.4601 | 0.9712 | −0.0532 | 0.7840 | −1.6186 |
| 0.1571 | −2.4418 | 0.9741 | −0.0335 | 0.7633 | −1.7096 |
| 0.1967 | −2.4143 | 0.9761 | −0.0192 | 0.7408 | −1.8000 |
| 0.2365 | −2.3783 | 0.9777 | −0.0078 | 0.7162 | −1.8902 |
| 0.2768 | −2.3336 | 0.9789 | 0.0007 | 0.6892 | −1.9796 |
| 0.3165 | −2.2816 | 0.9809 | 0.0061 | 0.6592 | −2.0681 |
| 0.3558 | −2.2223 | 0.9850 | 0.0095 | 0.6258 | −2.1554 |
| 0.3934 | −2.1587 | 0.9878 | 0.0104 | 0.5894 | −2.2381 |
| 0.4308 | −2.0883 | 0.9907 | 0.0105 | 0.5482 | −2.3181 |
| 0.4668 | −2.0142 | 0.9936 | 0.0097 | 0.5025 | −2.3924 |
| 0.5004 | −1.9388 | 0.9964 | 0.0080 | 0.4539 | −2.4571 |
| 0.5330 | −1.8603 | 0.9995 | 0.0031 | 0.4003 | −2.5136 |
| 0.5639 | −1.7806 | 0.9998 | −0.0033 | 0.3447 | −2.5582 |
| 0.5932 | −1.7001 | 0.9989 | −0.0126 | 0.2886 | −2.5908 |
| 0.6209 | −1.6195 | 0.9978 | −0.0250 | 0.2333 | −2.6125 |
| 0.6473 | −1.5383 | 0.9964 | −0.0410 | 0.1818 | −2.6245 |
| 0.6725 | −1.4568 | 0.9945 | −0.0622 | 0.1354 | −2.6294 |
| 0.6966 | −1.3750 | 0.9920 | −0.0902 | 0.0952 | −2.6296 |
| 0.7196 | −1.2929 | 0.9889 | −0.1243 | 0.0609 | −2.6263 |
| 0.7418 | −1.2103 | 0.9852 | −0.1647 | 0.0352 | −2.6152 |
| 0.7630 | −1.1276 | 0.9808 | −0.2111 | 0.0189 | −2.6007 |
| 0.7834 | −1.0447 | 0.9758 | −0.2637 | 0.0100 | −2.5880 |
| 0.8030 | −0.9616 | 0.9701 | −0.3224 | 0.0049 | −2.5770 |
| 0.8218 | −0.8783 | 0.9635 | −0.3875 | 0.0022 | −2.5682 |
| 0.8399 | −0.7947 | 0.9562 | −0.4587 | 0.0009 | −2.5616 |
| 0.8567 | −0.7142 | 0.9479 | −0.5364 | 0.0002 | −2.5558 |
|  |  |  |  | 0.0001 | −2.5524 |

A method of producing a tangential on-board injection (TOBI) system for a gas turbine engine includes casting a TOBI system, e.g. TOBI system 100 described above. Those skilled in the art will readily appreciate that, traditionally, producibility of TOBI systems with smaller dimensions by casting tend to be challenging, for example, it can be difficult to meet quality control standards for intricate geometries. It is contemplated that radius of curvature R, described above, allows for increased ease of manufacture and quality control, while still providing for tangential fluid flow at an outlet of TOBI system 100. Tangential fluid flow tends to increase the cooling effectiveness of TOBI system 100 by minimizing the temperature rise between trailing edge 110 and a cooling passage entrance.

The methods and systems of the present disclosure, as described above and shown in the drawings, provide for TOBI cooling systems for turbine engines with superior properties, such as, reduced size and weight, and increased ease of manufacture. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A tangential on-board injection (TOBI) system for a gas turbine engine, comprising:
   a first endwall;
   a second endwall radially spaced apart from the first endwall; and
   a plurality of airfoils extending radially from the first endwall to the second endwall, each airfoil having a leading edge and a trailing edge, wherein each airfoil includes a single first fillet portion transitioning between the airfoil and the first endwall and a single second fillet portion transitioning between the airfoil and the second endwall, wherein the radius of curvature of a portion of the single first fillet portion and a portion of the single second fillet portion proximate to the leading edge of the airfoil is larger than the radius of curvature of a portion of the single first fillet portion and a portion of the single second fillet portion proximate to the trailing edge of the airfoil, wherein an external surface of the airfoil is formed in accordance with a set of Cartesian coordinates set forth in Table 1.

2. The TOBI system of claim 1, wherein a pitch distance between the respective leading edges of two of the plurality of airfoils is more than twenty times the radius of curvature of a fillet portion proximate to the leading edge of the airfoil.

3. The TOBI system of claim 1, wherein the first and second endwalls are inner and outer endwalls, respectively, wherein inner endwall is radially inward from outer endwall.

4. The TOBI system of claim 1, wherein the radius of curvature of the first and second fillet portions proximate to the leading edge of each airfoil is 0.07 inches (1.8 mm).

5. The TOBI system of claim 1, wherein a mean gage distance between two of the plurality of airfoils is 0.16 inches (4.1 mm).

6. The TOBI system of claim 1, wherein a total mean gage area between the plurality of airfoils ranges from 0.80 in$^2$ (516 mm$^2$) to 0.97 in$^2$ (626 mm$^2$).

7. The TOBI system of claim 1, wherein the plurality of airfoils ranges from eighteen to twenty-eight airfoils.

8. The TOBI system of claim 1, wherein the first and second endwalls each include circumferentially segmented portions.

9. The TOBI system of claim 1, wherein the first and second endwalls form an annulus therebetween with a radial height of 0.26 inches (6.60 mm).

10. The TOBI system of claim 1, wherein the first and second endwalls define a centerline axis, wherein the distance from the centerline axis to an outer surface of the second endwall is 5.7 inches (14.5 cm).

11. The TOBI system of claim 1, wherein the first and second endwalls define a centerline axis, wherein the distance from the centerline axis to an outer surface of the first endwall is 5.4 inches (13.7 cm).

12. A tangential on-board injection (TOBI) system for a gas turbine engine, comprising:
    a first endwall;
    a second endwall radially spaced apart from the first endwall; and
    a plurality of airfoils extending radially from the first endwall to the second endwall, each airfoil having a leading edge and a trailing edge, wherein each airfoil includes a first fillet portion transitioning between the airfoil and the first endwall and a second fillet portion transitioning between the airfoil and the second endwall, wherein the radius of curvature of the first and second fillet portions proximate to the leading edge of the airfoil is larger than the radius of curvature of the first and second fillet portions proximate to the trailing edge, wherein an external surface of the airfoil is formed in accordance with a set of Cartesian coordinates set forth in Table 1.

13. A tangential on-board injection (TOBI) system for a gas turbine engine, comprising:
    a first endwall;
    a second endwall radially spaced apart from the first endwall; and
    an airfoil extending radially from the first endwall to the second endwall, the airfoil having a leading edge and a trailing edge, wherein the airfoil includes a single first fillet portion transitioning between the airfoil and the first endwall and a single second fillet portion transitioning between the airfoil and the second endwall, wherein the radius of curvature of a portion of the single first fillet portion and a portion of the single second fillet portion proximate to the leading edge of the airfoil is larger than the radius of curvature of a portion of the single first fillet portion and a portion of the single second fillet portion proximate to the trailing edge of the airfoil, wherein an external surface of the airfoil is formed in accordance with a set of Cartesian coordinates set forth in Table 1.

14. The TOBI system of claim 13, wherein the radius of curvature of each fillet portion proximate to the leading edge of the airfoil ranges from 0.063 to 0.085.

15. The TOBI system of claim 13, wherein the first and second endwalls form at least a portion of an annulus therebetween with a radial height ranging from 0.228 to 0.309.

16. The TOBI system of claim 13, wherein the first and second endwalls define a centerline axis, wherein the distance from the centerline axis to an outer surface of the second endwall ranges from 5.101 to 6.901.

17. The TOBI system of claim 13, wherein the first and second endwalls define a centerline axis, wherein the distance from the centerline axis to an outer surface of the first endwall ranges from 4.873 to 6.593.

18. An airfoil for a TOBI system comprising:
    an airfoil body having a leading edge and a trailing edge with an exterior airfoil surface therebetween, wherein the external airfoil surface is formed in accordance with a set of Cartesian coordinates set forth in Table 1.

* * * * *